Figure 7:
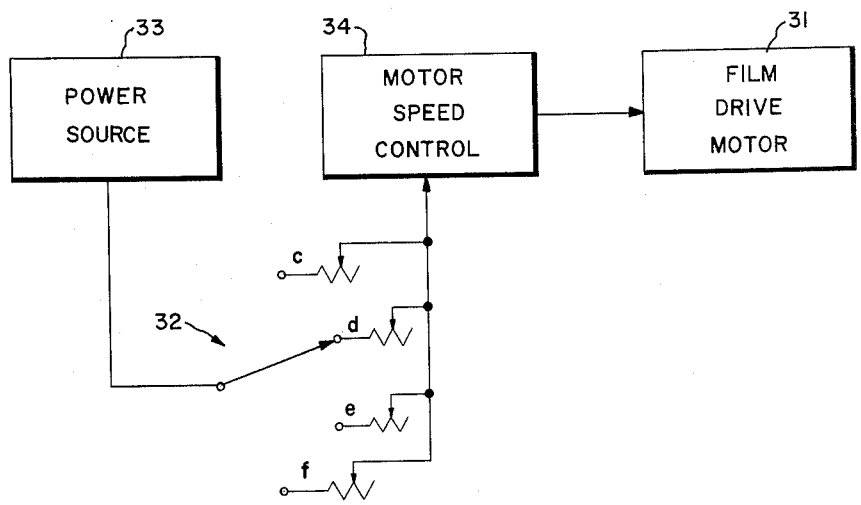

March 15, 1966  R. A. OSWALD  3,240,135
METHOD AND APPARATUS FOR PHOTOGRAPHING RACES
Filed Jan. 21, 1963  2 Sheets-Sheet 1
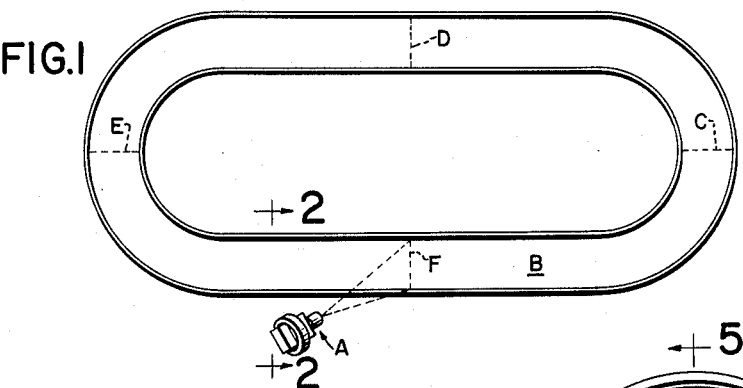
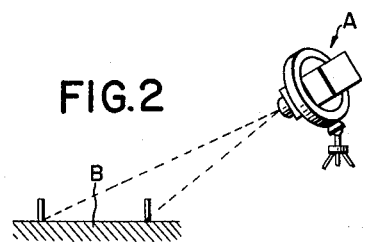
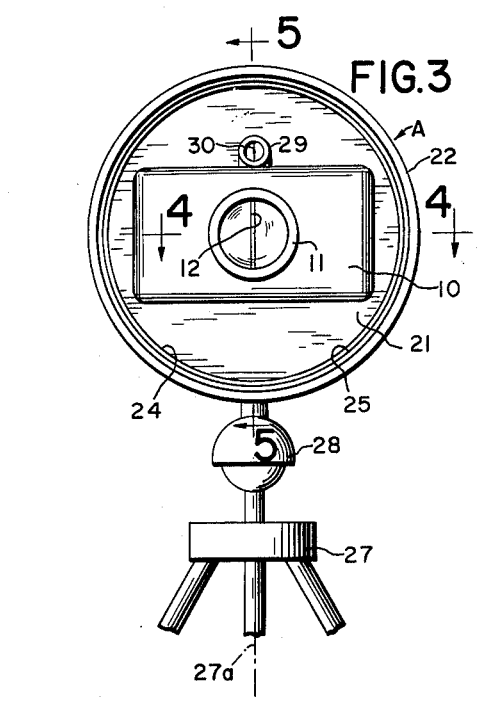
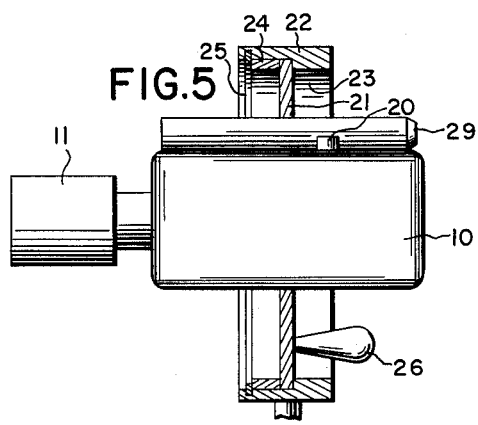
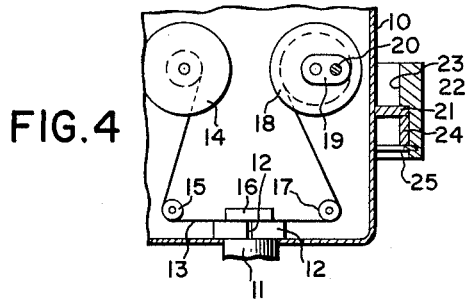
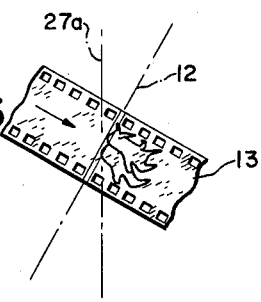
INVENTOR.
ROBERT A. OSWALD
BY
Townsend and Townsend
ATTORNEYS March 15, 1966  R. A. OSWALD  3,240,135

METHOD AND APPARATUS FOR PHOTOGRAPHING RACES

Filed Jan. 21, 1963  2 Sheets-Sheet 2

INVENTOR.
ROBERT A. OSWALD
BY
*Townsend and Townsend*
ATTORNEYS

United States Patent Office 3,240,135
Patented Mar. 15, 1966

3,240,135
METHOD AND APPARATUS FOR
PHOTOGRAPHING RACES
Robert A. Oswald, Los Angeles, Calif., assignor to
Thorobred Photo Service, Inc., Los Angeles, Calif.
Filed Jan. 21, 1963, Ser. No. 252,672
6 Claims. (Cl. 95—1)

This invention relates to improvements in the art of photographing racing contests for charting the position of contestants at different positions around a racecourse during the race.

It is common practice in horse races, dog races and similar events to obtain a photo-finish photograph at the finish line of every race to provide positive, accurate, record proof of the order of finish of specified racing contestants. The usual method employed is to position a "photo-finish" or time sequence camera to one side of and above the track and in the vertical plane through the finish line. The camera is of a so-called continuous strip type provided with a slit mask to define a uniform field of, for example, only an inch or two in width which runs transversely across the racetrack at the finish line. By suitable motor control means the film is continuously driven through the camera behind the slit at a speed related to the speed of the moving object photographed, the focal length of the lens employed and the distance from the lens to the moving object being photographed.

One of the problems encountered in the use of photo-finish cameras is the fact that the camera slit mask must be positioned in the vertical plane through the finish line or the photographic record obtained will not present a true picture of the actual order in which the contestants cross the line.

The principal object of the present invention is to provide a method and apparatus for taking a time sequence photograph along a particular line position about a race course from a position other than in a vertical plane through that particular line.

According to the present invention, a continuous strip camera is positioned outside the vertical plane through the line along which the time sequence photograph is taken, and the camera including the film axis is tilted so that the slit mask and the image at the camera of the line along which the photograph is taken are in registration.

One feature and advantage of the present invention lies in the fact that a time sequence photograph can be taken of the order in which contestants cross a particular line during the running of a race without necessitating the positioning of the camera exactly in the vertical plane through that particular line.

Another object of the present invention is to provide a method and apparatus for taking time sequence photographs at given positions around a racing course wherein the speed and direction of a moving film are changed to account for the different direction in which the contestants are moving at the given positions around the race course.

Another feature and advantage of this invention lies in the fact that the same camera positioned at a fixed position somewhere around a racecourse can record accurate time sequence photographs showing the order of contestants at given positions about the racecourse even though at the given positions around the course the direction and speed of the contestants will vary relative to the position of the camera.

Other objects of the present invention will become apparent on reading the following description and referring to the accompanying drawings in which similar characters of reference represent corresponding parts in each of the several views.

Figure 8:
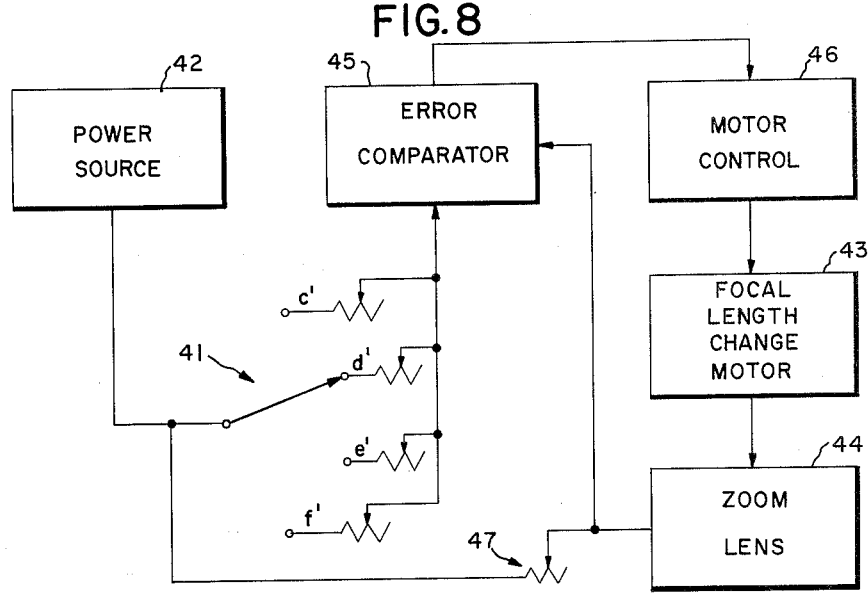

In the drawing:
FIGURE 1 is a plan view of a racecourse illustrating the use of the present invention;
FIGURE 2 is a side view of that portion of the racecourse in FIGURE 1 taken along a line 2—2 looking in the direction of the arrows;
FIGURE 3 is a front view, partially in the section, of a photo-finish camera utilized in the present invention;
FIGURE 4 is a top view, partially in section, of the camera shown in FIGURE 3;
FIGURE 5 is a side view, partially broken away, of the structure shown in FIGURE 4 taken along the line 5—5 looking in the direction of the arrows;
FIGURE 6 is a schematic view showing utilization of the present invention;
FIGURE 7 is a schematic view partially in block form illustrating an alternative embodiment of the present invention; and
FIGURE 8 is a schematic view partially in block form illustrating still another alternative embodiment of the present invention.

Referring now to the drawing, especially FIGS. 1 and 2, a "photo-finish" camera A is positioned above and to one side of a racing course, generally indicated as B. The camera is so positioned as to be able to take time sequence photographs of the order in which contestants cross given lines such as C, D, E and F during the running of a race.

Referring now to FIGS. 3-6, the camera includes a film case 10 provided with a standard lens 11. Mounted behind the lens 11 is a slit mask 12 used to define a narrow uniform field along the line across the racecourse at which the time sequence photograph is being taken. A film 13 unwinds from a film magazine 14 past a guide roller 15, and is threaded between the film mask 12 and a pressure plate 16. Thence the film 13 is lead past a drive roller 17 and onto a drive and take-up film magazine 18. The drive and take-up film magazine 18 is provided with a film speed control 19 which is adjusted by a control knob 20 on the outside of the film case.

The film case 10 is supported in the center of a circular mounting plate 21 which serves as a first frame and which is in turn rotatably supported in a second frame or mounting ring 22. The camera mounting ring 22 illustrated has a stepped inside diameter 23, and the mounting plate 21 is positioned against bearings (not shown) at the step in the diameter by a retaining ring 24 held in place by means of a snap ring 25. A handle 26 is provided on the plate 21 for rotating the mounting plate in the mounting ring 22.

The camera A is pivotally mounted on a tripod 27 by means of a ball and socket joint 28 secured to the base of the mounting ring 22. For properly aligning the slit mask 12 with the image at the camera of a line such as C, D, E or F along the race course a sight 29 positioned on top of the camera is provided with a hairline 30 aligned parallel with the slit mask 12 in the camera.

A continuous strip time sequence photograph is taken by aiming the camera at a particular line and rotating the mounting plate 21 with the handle 26 to align the hairline 30 and thus the slit mask 12 with the image of the line at the camera. Thus, the camera image of the line will be in registration with the slit on the film. Then the speed of the moving film is adjusted by means of knob 20 so that a true-to-life picture will be produced showing the horses in the proper order in which they cross the line. The ratio of the speed of the film and the moving object being photographed should be substantially equal to the ratio between the distance from the object to the lens 12 and the focal length of the lens.

Since the lens 11 produces an inverted image of the horses on the race course, the film 13 moves in a direction opposite to that in which the horses are moving when the time sequence photograph is being taken. FIGURE 6 shows schematically the motion of the film past the axis of the tilted mask 12.

The camera can be provided with a timing mechanism whereby the time sequence photograph indicates the elapsed time since the start of the race.

The same camera is used to take sequential time sequence photographs at given line positions such as C, D, E and F around the track for charting the race. Thus, an actual print of the order of the horses crossing a given line during a race is taken for use in establishing and maintaining proper handicaps.

The camera is pivoted on the tripod 27 and rotated in the ring 22 to position the hairline 30 and slit mask 12 parallel with the image of the first line C. After all of the horses have crossed line C, the camera is sequentially aimed at lines D, E and F.

As is apparent, at certain opposed positions around the track, the direction in which the horses are traveling is reversed. For example, when the horses cross the line D on the far side of the track from line F, they are traveling in a direction opposite to that in which they are moving when they cross line F. Similarly, horses are traveling opposite directions when they cross lines C and E. Therefore, the direction in which the film 13 is moving with respect to the track has to be reversed when taking pictures at these opposed lines. This is accomplished according to the present invention by merely rotating the camera A 180°. In the time sequence photograph produced on the film the images for the lines at which the horses travel opposite directions are inverted, but according to this invention each of the time sequence photographs taken at C, D, E and F is sequentially produced on the same film strip. Other more complicated arrangements for effectively reversing the film direction, such as, for example, a set of mirrors or a prism, can be made but merely rotating the camera is by far the simplest arrangement.

Since the lines C, D, E and F are at different distances from the camera A and since the speed of the horses at each of these lines relative to the camera is different, the ratio which determines the speed of the film is different for each of these lines. Also, this information varies from track to track. Therefore, the ratio has to be computed for each of the lines on the particular track at which time sequence photographs are taken. The camera A can be provided with a mechanical linkage that automatically adjusts the film speed for the proper ratio as the camera is moved on the ball and socket 28 and in the mounting ring 22.

Since, according to the structure described above, the film 13 will always be traveling in a direction normal to the length of the slit mask 12, a realistic image will be obtained. However, if it is not necessary to obtain a realistic image but only to obtain some indication of the elapsed time when an object passes a particular line position about the track and other means are used for obtaining the order in which the horses cross this line, the camera can be provided with means for only rotating the slit mask instead of rotating the axis of the moving film with the slit mask so long as the slit mask does not become aligned parallel with the direction in which the film is moving.

Since contestants of different height crossing a particular line produce a slightly erroneous time sequence photograph with a continuous strip camera positioned outside the vertical plane through the line, it is not possible to take a time sequence photograph of the finish of a race with a camera that is not positioned in the vertical plane through the finish line. However, for the purpose of charting the progress of the race an absolutely perfect photograph is not necessary and the present invention is utilized. Obviously, a camera constructed according to the present invention can be precisely positioned on the finish line and record the order of contestants past any line about the course as well as across the finish line.

Referring now to FIG. 7, there is illustrated one system for maintaining the ratio of the speed of the film and the speed of the moving object substantially equal to the ratio between the distance from the object to the lens and the focal length of the lens for producing true-to-life pictures at each of the lines C, D, E and F about the course. According to the structure illustrated in FIG. 7, these ratios are maintained substantially equal by changing the speed of the film drive motor 31 by changing the position of a selector switch 32 which selects the appropriate line from a series of lines c, d, e and f for feeding power from a source 33 to a motor speed control 34 which controls the motor 31. Each of the line c, d, e and f is provided with a variable resistor which is initially adjusted to provide the proper voltage to the motor 31 for camera operation when the camera is aimed at lines C, D, E and F, respectively, on the race course.

As an alternative to the structure shown in FIG. 7, the ratios referred to above are maintained substantially constant by changing the focal length of the lens. This is accomplished by utilizing a turret lens system on the camera and providing an appropriate focal length lens for each line spaced about the racecourse. Alternatively, according to the structure illustrated in FIG. 8, the focal length of a zoom lens is changed to an appropriate length for each of the lines C, D, E and F. A selector switch 41 is provided in the line from a source 42 to a focal length change motor 43 which changes the focal length of a lens 44. Movement of switch 41 selects the appropriate line c', d', e' or f' for a desired focal length, the lines c', d', e' and f' being provided with variable resistors which are initially adjusted to provide the proper voltage to the motor 43 for operation of the camera on lines C, D, E and F, respectively. Power from the source 42 is fed through one of lines c', d', e' or f' to an error comparator 45 and thence to a motor control 46 which operates the motor 43. A focal length sensor 47 indicates the focal length of the lens 44 and is connected to the error comparator 45 so that when the lens reaches the desired position the focal length change motor is turned off.

While only four lines C, D, E and F on the racecourse have been selected to describe operation of the present invention, it is obvious that any number of lines can be used.

Obviously, the speed of the film moving in the camera and the focal length could both be adjusted simultaneously to produce the desired ratio.

While these and other details have been shown of illustration and example for the purposes of clarity and understanding, it is understood that certain changes and modifications can be made within the spirit of the invention as limited by the scope of the attendant claims.

What is claimed:

1. A camera apparatus for photographically recording the order of passage of race contestants past a line between the edges of a racing strip; said camera apparatus elevated above and to one side of said line and outside the vertical plane through said line, comprising a camera casing, a lens mounted in said casing, means for continuously moving a film in said casing behind said lens, said lens constructed and arranged to project an image of said line upon said film, a mask positioned between said lens and said film and having a narrow slit therein extending transversely across said film and means to rotate said camera about the optical axis of the lens for positioning said slit in registration with the image of said line on said film.

2. A camera apparatus for photographically recording the order of passage of race contestants past a line between the edges of a racing strip, said camera apparatus elevated above and to one side of said line and outside the vertical plane through said line, comprising one mounting frame, a camera casing supported in said one frame, a lens mounted in said casing, means for continuously moving a film in said casing behind said lens, said lens constructed and arranged to project an image of said line upon said film, a mask positioned between said lens and said film and having a narrow slit therein extending transversely across said film, and another mounting frame, said one frame operatively rotatable about the optical axis of the lens in said other frame to position said slit in registration with the image of said line on said film.

3. A camera apparatus for sequentially photographically recording the order of race contestants past given lines arranged across a continuous racing course, said camera apparatus elevated above and to one side of the racing course, comprising one mounting frame, a camera casing supported in said one frame, a lens mounted in said casing, means for moving a film strip in said casing behind said lens, said lens constructed and arranged to project an image of each of said lines upon said film when aimed at the respective lines, a mask positioned between said lens and said film strip and having a narrow slit therein extending transversely across said film strip, and another mounting frame, said one frame operatively rotatable through 360° in said other frame to sequentially position said slit in registration with the images of said given lines around said racing course on said film with said moving film at each position of said camera moving in the same direction relative to the direction of the contestants crossing that line as at the other lines.

4. A camera apparatus for sequentially photographically recording the order of race contestants across given lines arranged across a continuous racing course, comprising one mounting frame, a camera casing supported in said one frame, a lens mounted in said casing, means for moving an elongate film strip in said casing behind said lens, said lens constructed and arranged to project an image of said line upon said film, a mask positioned between said lens and said film strip, and having a narrow slit therein extending transversely across said film strip, another mounting frame, means for pivotally supporting said other frame above and to one side of the racing course, and means for rotatably supporting said one frame on said other frame for 360° rotation of said casing with respect to said other frame to sequentially aim said camera at said given lines around said racing course for producing time sequence photographs at each of said lines with said slit sequentially positioned in registration with the image of each of said lines and with the film in said camera always moving in the same direction relative to the direction of the contestants at each line at which a time sequence photograph is taken as at the other lines.

5. A camera apparatus for sequentially photographically recording the order of race contestants across given lines arranged across a continuous racing course, comprising one mounting frame, a camera casing supported in said one frame, a lens mounted in said casing, means for moving an elongate film strip in said casing behind said lens, said lens constructed and arranged to project an image of said line upon said film, a mask positioned between said lens and said film strip, and having a narrow slit therein extending transversely across said film strip, another mounting frame, means for pivotally supporting said other frame above and to one side of the racing course, means for rotatably supporting said one frame on said other frame for 360° rotation of said casing with respect to said other frame to sequentially aim said camera at said given lines around said racing course for producing time sequence photographs at each of said lines with said slit sequentially positioned in registration with the image of each of said lines and with the film in said camera always moving in the same direction relative to the direction of the contestants at each line at which a time sequence photograph is taken as at the other lines, and means for changing speed of said elongate film strip in said casing to correspond to the relative speed and distance of the contestants when said camera is aimed at different given lines.

6. A camera apparatus for sequentially photographically recording the order of race contestants across given lines arranged across a continuous racing course, comprising one mounting frame, a camera casing supported in said one frame, a lens mounted in said casing, means for moving an elongate film strip in said casing behind said lens, said lens constructed and arranged to project an image of said line upon said film, a mask positioned between said lens and said film strip, and having a narrow slit therein extending transversely across said film strip, another mounting frame, means for pivotally supporting said other frame above and to one side of the racing course, means for rotatably supporting said one frame on said other frame for 360° rotation of said casing with respect to said other frame to sequentially aim said camera at said given lines around said racing course for producing time sequence photographs at each of said lines with said slit sequentially positioned in registration with the image of each of said lines and with the film in said camera always moving in the same direction relative to the direction of the contestants at each line at which a time sequence photograph is taken as at the other lines, and means for changing the focal length of said lens in said casing to correspond to the relative speed and distance of the contestants when said camera is aimed at different given lines.

References Cited by the Examiner
UNITED STATES PATENTS

| | | | |
|---|---|---|---|
| 2,590,389 | 3/1952 | Doyle | 346—107 |
| 2,708,616 | 5/1955 | Oswald | 346—107 |
| 2,785,945 | 3/1957 | Kuprion | 346—107 |

JOHN M. HORAN, *Primary Examiner.*

NORTON ANSHER, *Examiner.*